3,846,109
FLOAT GLASS BATH FENDER SUPPORTS

Eldwin C. Montgomery, Modesto, Calif., and Donald E. Shamp, Millbury, and Francis L. Swillinger, Perrysburg, Ohio, assignors to Libbey-Owens-Ford Company, Toledo, Ohio
Filed Aug. 21, 1972, Ser. No. 282,453
Int. Cl. C03b 18/02
U.S. Cl. 65—182 R                                    5 Claims

ABSTRACT OF THE DISCLOSURE

A buoyant side wall fender in the bath area of a float glass apparatus has support means therebeneath for maintaining it upwardly in engagement with a "hold-down" prior to the molten metal reaching its normal operating level during start up of the bath. The support means comprises a frangible member directly beneath the fender, separate and independent from it.

BACKGROUND OF THE INVENTION

Field of the Invention

The present invention relates broadly to the production of float glass, and more particularly to supporting means for the buoyant carbon side wall fenders in the bath area of a float glass apparatus during start up thereof.

DESCRIPTION OF THE PRIOR ART

A conventional form of float glass forming apparatus is illustrated and described in U.S. Pat. No. 3,083,551, granted Apr. 2, 1963. As therein explained, the manufacture of float glass by the float process involves delivering glass at a controlled rate onto a bath of molten metal and advancing it along the surface of the bath within a "float atmosphere" under physical and thermal conditions which assure (1) that a buoyant body of molten glass will be established on the bath, (2) that the glass in said body will flow laterally to develop on the surface of the bath a buoyant layer of molten glass of stable thickness, and (3) that said buoyant layer will be continuously advanced, in the form of a ribbon, along the bath and sufficiently cooled as it advances to permit it to be taken unharmed out of the bath by mechanical conveying means.

As shown in the aforementioned patent, the molten metal which supports the glass is contained within a refractory lined bath structure comprised of a bottom or floor and opposite side and end walls. In preparing the bath for initial operation, it is necessary to gradually heat the bath structure to operating temperature in order to dry the refractories and allow for thermal expansion of the structure. After the bath structure has reached a suitable temperature, ingots of the metal to be employed therein (generally tin or an alloy thereof) are added to establish the molten bath. Thereafter, the glass is introduced and advanced over the surface of the molten metal to establish a continuous ribbon.

For one reason or another, the ribbon may occasionally tend to veer toward one side or the other as it moves over the molten metal bath. The molten glass and resultant ribbon are generally guided by means of lateral convection currents in the molten metal created by devices referred to in the art as "water fences." The water cooled fences, extending into the bath and selectively spaced along either or both sides of the glass, by modifying the temperature of the bath therein, can control the force of the convection currents, urging the glass toward one side or the other. Improper operation of the fences can cause the lateral steering force of the current to dominate in one direction whereupon the buoyant glass, due to its inability to resist the dominant force, may veer from its desired intermediate path and come into contact with the side walls of the bath chamber. The problem of side wall contact may also be encountered in a situation wherein a malfunction occurs between the rate of flow of molten glass delivered onto the bath and the speed of the drawing rolls, so as to allow an excessive amount to enter the bath thereby causing the glass to drift toward the side walls.

Due to these and other possibilities, it has been proposed that fenders of a suitable material be disposed longitudinally adjacent the lateral sides of the bath chamber, and even that the entire bath chamber be lined with such material. Carbon has been found to be well suited for this purpose since it is inert to the molten metal and the glass, and also is not wetted thereby so that sticking and piling up of the glass in the event of contact are prevented.

In order to hold them in position, the carbon fenders may be affixed to the side walls or, as illustrated and described in U.S. Pat. No. 3,481,729, granted Dec. 2, 1969, inasmuch as carbon has a density less than that of the molten metal (generally tin), they may be maintained in a partially submerged position by means of holding structures. As illustrated in the aforementioned patent, the holding structure, referred to in the prior art as a "hold-down," may be in the form of a counterweighted metallic strap extending through and beyond a recess in a side wall refractory block. The inner end of each strap has a downwardly extending hook which is received in an associated cavity of the carbon fender, with the opposite end being angularly disposed intermediate the outward facing surface of the side block and the outside wall or casing of the bath structure.

It has been found economically and structurally feasible to use a fender somewhat smaller in vertical dimension than that illustrated in the aforementioned Pat. No. 3,481,729, giving it a substantially square cross-section appearance. Carbon fenders of this nature can be held in their partially submerged position during normal operation, substantially in the same manner as illustrated and described in the prior art. However, with such an arrangement, prior to the molten metal reaching its normal operating level during start up the carbon fenders, due to the absence of support delivered by the molten metal, will not remain in engagement with their associated hold-down but will rest upon the bottom with the hooks becoming disengaged from the cavities in the fenders.

SUMMARY

According to the present invention, the problem of holding the carbon side wall fenders in operative position during starting and filling of the bath has been entirely eliminated by providing support in the form of one or more pegs beneath each of the fenders. The pegs, preferably of an inert material of the type from which the fenders are formed, are inserted at their upper ends into related openings in the bottom of the fender with their lower ends resting upon the bottom of the bath.

It is, therefore, a primary object of the invention to provide a means for holding the side wall fenders in position during starting of the bath.

Another object of the invention is to provide such means in the form of a support beneath the fenders which will permit them to be removed and replaced during continued operation of the bath.

Another object is to provide such a support which is simple, inexpensive, and can be installed in the field during construction of the bath.

Still another object is to provide a support means in which a portion of a frangible peg is inserted into an opening in the bottom of the fender with the remaining portion thereof extending downwardly to the floor of the bath so as to support the fender in an elevated position in engagement with an associated hold-down bracket during start up.

Other objects and advantages of the invention will become apparent during the course of the following description when taken in connection with the accompanying drawings.

BRIEF DESCRIPTION OF THE DRAWINGS

In the drawings, wherein like numerals are employed to designate like parts throughout.

DESCRIPTION OF THE PREFERRED EMBODIMENT

Figure 1:
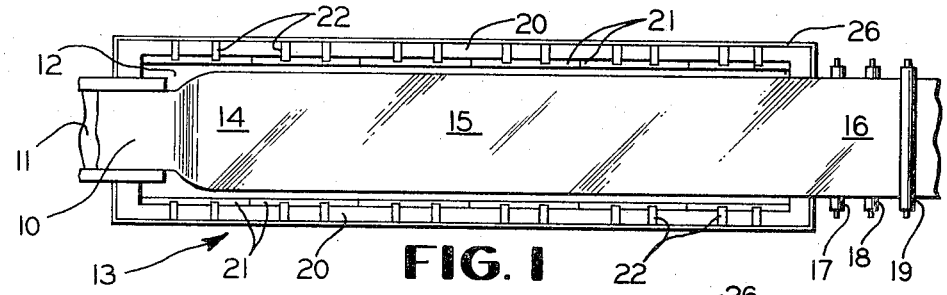
FIG. 1 is a plan view of a conventional float glass forming apparatus with the plenum chamber removed.

Referring now more particularly to the drawings, there is illustrated generally in FIG. 1 a typical float glass machine similar to that disclosed in U.S. Pat. No. 3,083,551. In this apparatus, molten glass 10 supplied from a forehearth (not shown) through a spout 11 falls freely onto a bath of molten metal 12 contained in a chamber 13 and forms a buoyant body of molten glass indicated at 14.

A buoyant layer of stable thickness 15 develops therefrom, and the ultimate ribbon 16 is formed from this buoyant layer. The temperature in the buoyant layer 15 and ribbon 16 are carefully controlled so that the glass is progressively cooled to the discharge end of the apparatus, by which time the ribbon surface reaches a temperature at which it is sufficiently stiffened to allow its transfer to a lehr on mechanical conveying means without detriment to the surface.

One type of mechanical conveying means that may be employed includes supporting rolls 17 and 18 and an overlying roll 19 in gripping contact with the upper surface of the ribbon, mounted outside the discharge end of the tank. Any or all of the rolls may be driven and cooperate to apply a tractive effort to the ribbon of glass moving towards the outlet end sufficient to advance it along the bath.

Figure 2:
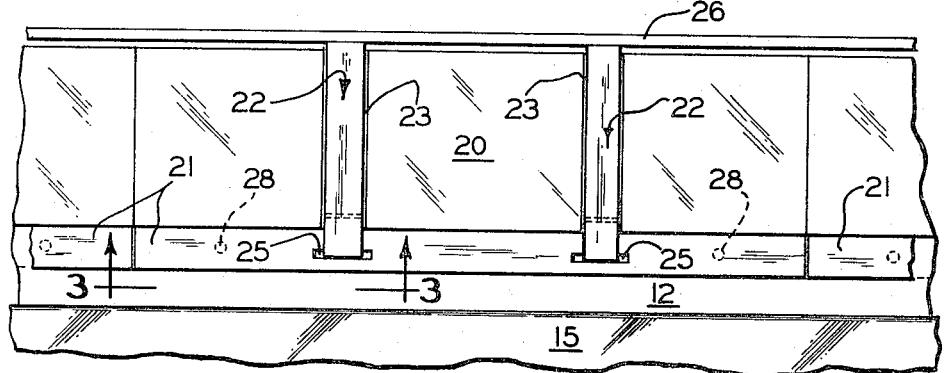
FIG. 2 is a plan view on an enlarged scale of a portion of the apparatus of FIG. 1, showing the fenders and the novel supporting pegs of the invention.
Figure 3:
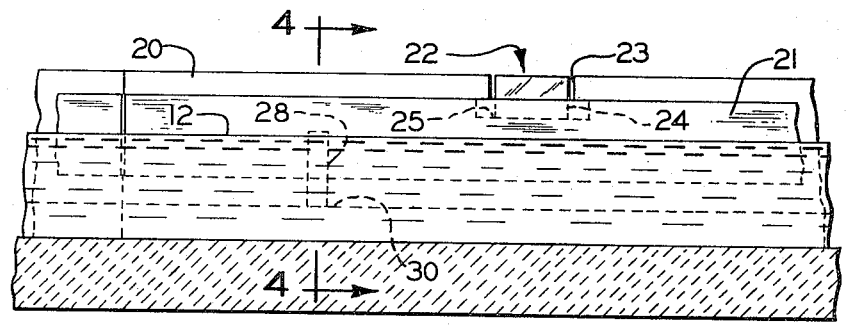
FIG. 3 is a longitudinal vertical section taken substantially along line 3—3 of FIG. 2.

The sides of the bath chamber 13 are defined by refractory walls 20, and as hereinabove described, there is a possibility of the molten body 14 or buoyant layer 15 accidently coming into contact with these refractory side walls. Thus, a fender 21 comprised of a series of elongated carbon blocks is provided adjacent the opposing side walls 20 and along at least a part if not the entire length of the chamber 13, as outlined in the aforementioned U.S. Pat. No. 3,481,729. The carbon fenders 21, since they are of a lesser density than the molten metal 12, are held in a partially submerged position adjacent the side walls 20 by means of hold-down brackets 22 as shown in FIGS. 2 and 3.

Figure 4:
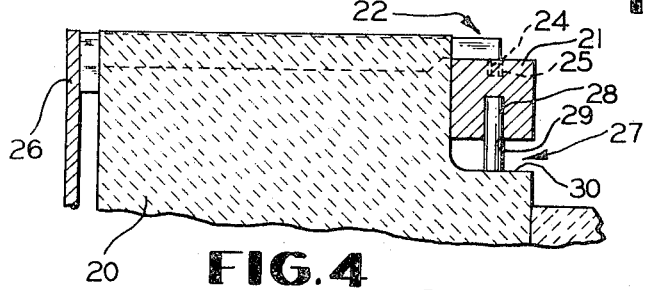
FIG. 4 is a fragmentary vertical section taken substantially along line 4—4 of FIG. 3.

In order to facilitate sealing of the sides of the bath structure against the loss of bath atmosphere, the top surfaces of the walls 20 are provided therein with a plurality of recesses 23 (FIGS. 2 and 3) for receiving the brackets 22. The brackets have their inner ends turned downwardly forming hooks 24, as best shown in FIG. 4, which are received in associated cavities 25 of the fenders 21. The outer ends may be attached to the outer side wall or casing 26 of the chamber 13 in any conventional manner or, as illustrated in FIG. 4, may simply be provided with a turned down end for insertion intermediate the refractory side wall 20 and the outer side wall or casing 26 to restrict lateral movement. As best shown in FIG. 4, although not essential, the refractory side wall blocks 20 may be cut out as indicated at 27 to receive the carbon fenders 21 and still maintain the full potential width of the bath. It is thus possible to add fenders to the bath area of a new or existing float apparatus without detracting from its operative width. As indicated above, the buoyancy of the metal cooperates with the hold-downs to maintain the carbon fenders in position once the bath is in operation, but with the prior art devices there is no support for the fenders before addition of the metal to the bath.

As hereinbefore explained, to prepare it for operation it is necessary to gradually heat the bath structure to working temperature, with metal ingots being added at the proper point in the heat-up process to establish the molten bath. While it is possible to remove the side seal panels (not shown), which close the space between the top of the refractory side wall 20 and the upper portion of the bath chamber of an operating float glass bath and install the fenders through this opening, it is much simpler to install them during construction of the bath structure and before it has been heated. Once the molten metal is in place it is essential that a protective float atmosphere (generally a mixture of nitrogen and hydrogen) be maintained thereover and oxygen be excluded so as to prevent formation of oxides in the molten meal which might adversely affect the glass. Removal of the side seal panels for installation of the fenders after the bath is heated permits escape of bath atmosphere and ingress of oxygen. The hydrogen in the escaping bath atmosphere burns with an almost invisible flame as it encounters the oxygen, creating the conditions known as "sting-out" and making working in the area difficult. Once subjected to the high temperature of the bath, the carbon fenders must also be protected by the float atmosphere since they will rapidly deteriorate if contacted by oxygen at the temperatures encountered. Thus, it will be apparent that initial installation of the fenders before heating of the bath structure and before the molten metal reaches its operating level, is highly desirable.

In accordance with the present invention, means for supporting the carbon fenders within the batch area prior to addition of the metal is effectively attained. Thus, in the preferred embodiment as shown in FIGS. 2 through 4, each of the carbon fenders 21 is provided with one or more pegs or support members 28 to hold it in an elevated position. The underside of each fender is provided with openings in the form of vertical blind holes for receiving the pegs. As illustrated, the upper end of the peg 28 is inserted into an opening 29, with its opposite end extending downwardly therefrom to rest upon the bottom 30 of the cutout 27. The pegs are of a predetermined length so that with one end in the opening 29 and the other resting on the bottom of the cutout, they will be capable of maintaining each hook 24 in engagement with its associated cavity 25. Thus, the pegs act as auxiliary supports to hold the fenders in their normal operative position in engagement with the hold-down brackets as if they were floating in the molten metal.

The individual fender segments 21 are normally on the order of three feet in length, with two of the pegs 28 being employed in holding each segment as illustrated in the drawings. The fender segments are relatively light in weight, and it is contemplated that shorter than normal segments may temporarily be supported by one peg 28 until the molten metal reaches operating level. Conversely, it will be understood that when using a fender of a longer length, it may be necessary to employ more than two pegs to adequately support it in an engaged position with each of its hold-down brackets. The pegs are formed of a frangible material, and if it should be necessary for any reason to change a fender segment during continued operation of the bath, they may merely be broken off so that the fender can be depressed into the molten metal and disengaged from the hold-down bracket 22. The support pegs are not necessary with the new fender segment since it will be maintained in engagement with the bracket 22 by the buoyant effect of the molten metal.

In an alternate form of the invention, an adjustment is provided for each of the carbon pegs or support members whereby the fenders are vertically adjustable. As indicated above the pegs, for purposes of support, rest upon the bottom of the cutout or floor to maintain the fenders in engagement with the hold-down brackets. It will, therefore, be understood that any irregularities in the surface of the cutout or the floor, whichever is being used as the supporting base, may present problems during installation. Any undue deviation in the floor line along the length of the fender may make it impossible to use a standard size peg for each support. Such irregularities would necessitate using pegs of various lengths to assure proper vertical alignment and engagement of the fender with each of its hold-downs. Furthermore, the length of each supporting peg would have to be determined during installation of the fenders by a more or less trial and error method which can prove to be time consuming and expensive.

Figure 6:
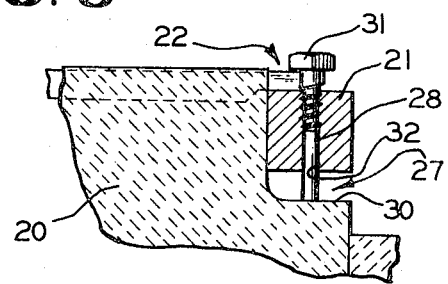
FIG. 6 is a fragmentary vertical section taken substantially along line 6—6 of FIG. 5.
Figure 5:
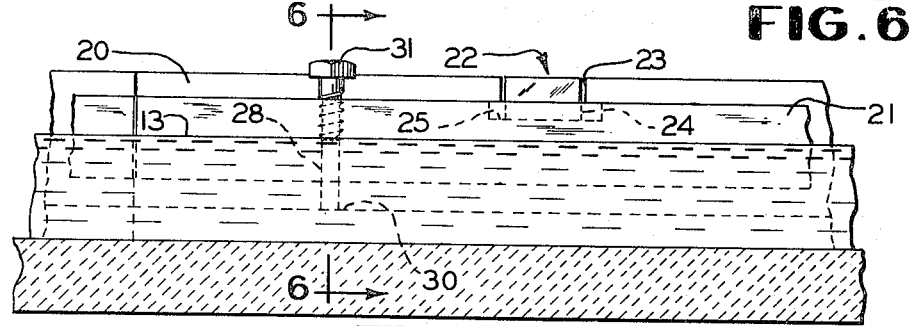
FIG. 5 is a view similar to FIG. 3 but illustrating a second embodiment of the invention.

In accordance with the alternate embodiment of the invention, there is provided a support incorporating means for vertical adjustment to compensate for any such irregularities. As shown in FIGS. 5 and 6, the vertical adjusting means is in the form of a bolt 31 located above and axially aligned with the peg 28. The opening 32 for receiving the peg 28 extends completely through the fender 21 and is of a diameter slightly larger than that of the peg to allow for its slidable movement therein. At least the upper portion of the opening 32 is threaded to receive the adjusting bolt 31. Due to the rather soft nature of the carbon used for the fenders, it is preferable that the bolt be of a coarse thread design. Although not limited thereto, a lag bolt has been found well suited for this purpose. The bolt is threaded downwardly through the hole into a bearing relationship with the top surface of the peg. Turning of the bolt in one direction causes the peg to slidably move within the hole in a downward direction due to the force exerted thereby on its top surface. Conversely, turning the bolt in the opposite direction frees the peg for slidable movement in an upward direction. Therefore, by means of the adjusting bolt 31, the pegs 28 may be effectively retracted or extended any desired distance from the underside of the fender 21.

The comparative ease with which a fender incorporating the invention may be installed despite irregularities in the cutout or bath floor will be readily understood. By way of illustration, after the hold-down brackets 22 are in place, the fender 21 with its supporting pegs 28 sufficiently retracted to clear the bottom 30 of the cutout, is brought into engagement therewith while aligning its cavities 25 with the hooks 24 of each hold-down. Holding the fender in this upward engaging position, the pegs 28 are individually extended by turning the adjusting bolt 31 in the appropriate direction to bring them into communication with the bottom 30 of the cutout. In such manner, the fenders may be supported in their normal operative position in engagement with the hold-down brackets as if they were floating in the molten metal. Thus, in the present form of the invention the need for pegs of various lengths is eliminated, simplifying installation and keeping costs at minimum.

Should any of the fenders need replacement during continued operation of the bath due to deterioration or damage, this may be accomplished without interrupting operation of the bath by first removing the adjacent side seal panel. The adjusting bolts 31 are then loosened sufficiently to permit the pegs 28 to recede into the opening 32. If the peg does not slide freely within the opening, downward pressure applied to the top of the fender will force its recession. With the pegs 28 in a retracted position, the fenders 21 may then be released from its hold-down bracket by depressing into the molten metal 12 so as to disengage the hook 24 from the cavity 25 and thereafter removed from the bath. When installing a replacement fender or additional fenders during continued operation, the pegs are not, of course, necessary for support as the buoyant effect of the molten bath will maintain them in position. Therefore, the new fender may simply be depressed into the metal, aligning its cavities 25 with the hooks 24 of the hold-downs so as to permit the buoyancy of the metal to induce engagement. If it is found desirable to retain the novel supporting pegs of the invention when installing the new fenders, the procedure used for removal is then reversed. In such manner, the pegs and lag bolts may be inserted into the fender prior to installation or, if more convenient, after the fender is in place. In the latter, the pegs are inserted downwardly through the opening in the top of the fender after which the lag bolt may then be inserted to enter upon a bearing relationship therewith.

In any event, it is to be understood that the forms of the invention herewith shown and described are to be taken as illustrative embodiments only of the same, and that various changes in the shape, size and arrangement of the parts may be resorted to without departing from the spirit of the invention as defined in the following claims.

We claim: :

1. In an elongated float glass bath for containing a body of molten metal upon which molten glass is deposited and formed into a continuous ribbon of glass, including a floor, longitudinally extending side walls, an independent fender unit to which glass will not stick extending along the inner face of at least a portion of one of said walls and spaced above said floor, and a hold-down bracket engaging said fender unit and restraining said fender unit against upward and lateral movement, the improvement comprising a frangible support member directly beneath said fender unit separate and independent from said fender unit and extending upwardly into engagement therewith, said support member providing auxiliary support for said fender unit for holding said fender unit upwardly in engagement with said hold down bracket in the absence of buoyant support by said body of molten metal.

2. An elongated float glass bath as claimed in claim 1, including a pair of said support members positioned at spaced locations along said fender unit.

3. An elongated float glass bath as claimed in claim 1, wherein said fender unit includes means defining a recess extending upwardly from the bottom of said fender unit, and said support member comprises a peg extending upwardly into said recess.

4. An elongated float glass bath as claimed in claim 1, wherein said support member comprises a carbon peg inserted into a blind opening extending upwardly from the lower surface of said fender unit partially through said fender unit.

5. An elongated float glass bath as claimed in claim 1, wherein said support member includes means defining an opening extending vertically through said fender unit, a peg extending into said opening from the lower end thereof with the lower end of said peg bearing against a supporting surface, and an adjusting means threadably received in the upper end of said opening with its lower end bearing against the upper end of said peg.

References Cited

UNITED STATES PATENTS

| | | | |
|---|---|---|---|
| 3,481,729 | 12/1969 | Alonzo et al. | 65—99 A X |
| 3,409,423 | 11/1968 | Lajarte | 65—99 A X |
| 3,647,408 | 3/1972 | Dickinson | 65—182 R X |
| 3,615,333 | 10/1971 | Lawrenson et al. | 65—99 A X |

S. LEON BASHORE, Primary Examiner

K. M. SCHOR, Assistant Examiner

U.S. Cl. X.R.

65—99 A

PO-1050
(5/69)

UNITED STATES PATENT OFFICE
CERTIFICATE OF CORRECTION

Patent No. 3,846,109      Dated November 5, 1974

Inventor(s) Eldwin C. Montgomery et al

It is certified that error appears in the above-identified patent and that said Letters Patent are hereby corrected as shown below:

Col. 1, line 34, "float" should be --flat-- , 1st occ.
Col. 4, line 3, after "the" insert --side--
Col. 4, line 55, "batch" should be --bath--

Signed and sealed this 31st day of December 1974.

(SEAL)
Attest:

McCOY M. GIBSON JR.
Attesting Officer

C. MARSHALL DANN
Commissioner of Patents